United States Patent
Forslund et al.

(10) Patent No.: US 7,178,698 B2
(45) Date of Patent: Feb. 20, 2007

(54) CONTAINER WITH DISCHARGING DEVICE

(75) Inventors: Kjell Forslund, Sundsbruk (SE);
Mikael Svedman, Vaasa (FI)

(73) Assignee: Metso Paper, Inc. (FI)

( * ) Notice: Subject to any disclaimer, the term of this patent is extended or adjusted under 35 U.S.C. 154(b) by 479 days.

(21) Appl. No.: 10/493,261

(22) PCT Filed: Oct. 16, 2002

(86) PCT No.: PCT/SE02/01882

§ 371 (c)(1),
(2), (4) Date: Apr. 21, 2004

(87) PCT Pub. No.: WO03/035971

PCT Pub. Date: May 1, 2003

(65) Prior Publication Data
US 2004/0244932 A1 Dec. 9, 2004

(30) Foreign Application Priority Data
Oct. 24, 2001 (SE) .................................. 0103550

(51) Int. Cl.
*B67D 5/06* (2006.01)
*G01F 11/24* (2006.01)
(52) U.S. Cl. ................ 222/185.1; 222/411; 222/413; 222/462
(58) Field of Classification Search ............ 222/185.1, 222/411, 412, 413, 460, 462
See application file for complete search history.

(56) References Cited

U.S. PATENT DOCUMENTS

| 3,425,640 | A | * | 2/1969 | Macholdt et al. | ............ 241/236 |
| 4,079,863 | A | * | 3/1978 | Bouyer et al. | ............... 222/238 |
| 4,744,669 | A | * | 5/1988 | Kowalczyk et al. | ........... 366/77 |
| 4,759,633 | A | * | 7/1988 | Schmid | .................... 366/158.2 |
| 5,154,326 | A | * | 10/1992 | Chang et al. | ................ 222/196 |
| 5,709,322 | A | * | 1/1998 | Ricciardi | ..................... 222/227 |
| 6,336,573 | B1 | * | 1/2002 | Johanson | ..................... 222/412 |

FOREIGN PATENT DOCUMENTS

| WO | WO-95/21287 A1 | 8/1995 |
| WO | WO-99/23019 A1 | 5/1999 |

* cited by examiner

*Primary Examiner*—Joseph A. Kaufman
(74) *Attorney, Agent, or Firm*—Lerner, David, Littenberg, Krumholz & Mentlik, LLP

(57) ABSTRACT

Containers for collecting and discharging particulate lignocellulosic material are disclosed, including a cylindrical upper portion, a lower portion tapering towards a bottom elongated space, an exit pipe below the bottom, a pair of parallel screws mounted on parallel shafts in the elongated space in a common horizontal plane for feeding the particulate lignocellulosic material towards the exit pipe, a pair of distributors disposed on the parallel screws above the exit pipe comprising radial discs, and a pump below the exit pipe for transporting the particulate lignocellulosic material to a subsequent step.

9 Claims, 1 Drawing Sheet

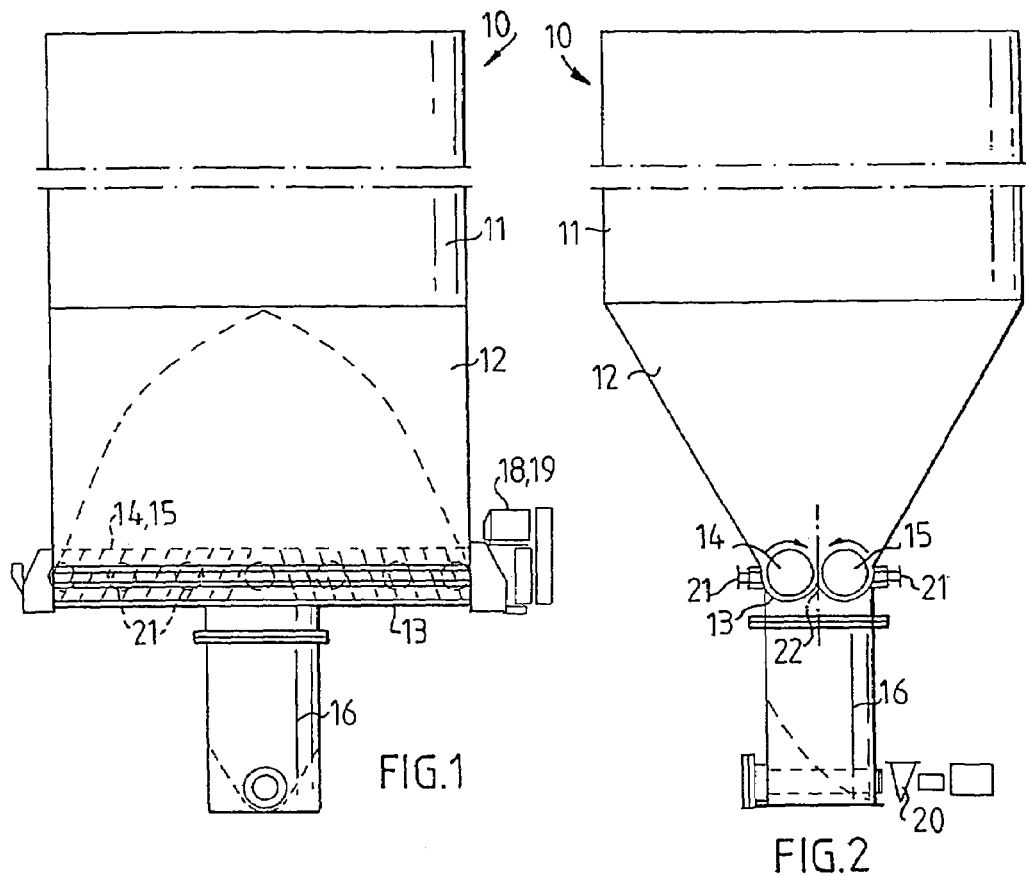
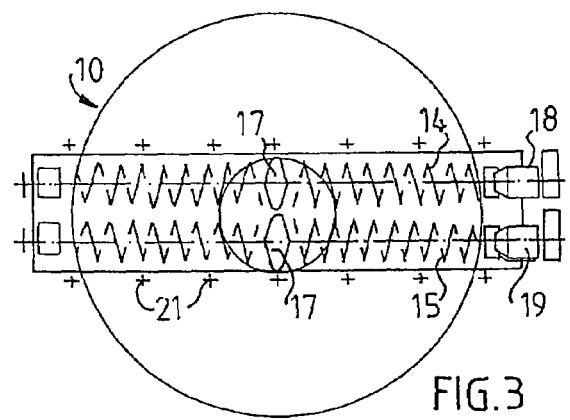

CONTAINER WITH DISCHARGING DEVICE

FIELD OF THE INVENTION

The present invention relates to a container for the collecting and discharging of particulate lignocellulosic material.

BACKGROUND OF THE INVENTION

In connection with the manufacture of papermaking pulp, various steps of the process include material being transported in the form of chips or pulp. In certain parts of the process the material must be fed uniformly from containers for storage and/or treatment of the material to a subsequent treatment step, for example, the feeding of chips from a storage container to a digester. The problem in this case is to bring about a uniform flow through the container. The material can adhere to the walls of the container and thereby cause arching and/or the material can move at different speeds in different parts of the cross-section of the container. The feed of the material through the container can thus be stopped, or the stay-time of the material in the container can vary. This is particularly unfavourable when the material is subjected to some kind of treatment in the container, for example preheating with steam or treatment with chemicals.

Many different solutions of the above problem have been suggested. The walls of the container, for example, can be provided different configurations and angles, and different types of discharge means can be placed in the container. All these solutions, however, have disadvantages, and therefore the problem at least partially remains.

SUMMARY OF THE INVENTION

In accordance with the present invention, these and other problems have now been realized by the invention of a container for collecting and discharging particulate lignocellulosic material comprising a substantially cylindrical upper portion having a first cross-section, a lower portion tapering from the substantially cylindrical upper portion to a bottom defining an elongated space, an exit pipe disposed below the bottom of the container, the exit pipe having a second cross-section and disposed substantially centrally below the elongated space, the second cross-section being less than the first cross-section, a pair of parallel screws mounted on a pair of parallel shafts disposed in the elongated space in a common horizontal plane, the pair of parallel screws being adapted to feed the particulate lignocellulosic material towards the exit pipe, a pair of distributors for the particulate lignocellulosic material disposed on the respective pair of parallel screws at a location above the exit pipe, the pair of distributors comprising a pair of substantially radial discs, and a pump disposed below the exit pipe for transporting the particulate lignocellulosic material to a subsequent step. Preferably, the screws comprise threads including flanks having an upper portion adapted for conveying the particulate lignocellulosic material, the bottom defining the elongated space having a configuration including a raised portion defining an upper edge, the upper portion of the thread flanks being disposed above the upper edge of the elongated space. In a preferred embodiment, the pair of parallel shafts includes a central axis disposed substantially at the upper edge of the elongated space.

In accordance with one embodiment of the container of the present invention, the threads include intermediate spaces between the threads which increase in the direction towards the exit pipe. Preferably, the threads have an increasing pitch in the direction towards the exit pipe. In another embodiment, however, the pair of parallel shafts includes a diameter which decreases in the direction towards the exit pipe.

In accordance with one embodiment of the container of the present invention, the substantially radial discs have a disc diameter and the screw threads have a thread diameter, the disc diameter being substantially the same as the thread diameter. In a preferred embodiment, the substantially radial discs have a center and a thickness which decreases outwardly from the center.

In accordance with one embodiment of the container of the present invention, the container includes entry means for addition of a treatment medium into the elongated space.

The present invention offers a solution to the above-noted problems in that the bottom of the container is provided with a discharge device comprising two counter-rotating parallel screws located above a narrow down pipe.

According to the present invention, a substantially cylindrical container converges at its lower portion from two opposed sides down to an oblong space in the bottom of the container. In that oblong space, which in one embodiment has a substantially rectangular cross-section, or at its ends has a rounded cross-section, two co-operating counter-rotating screws are placed. The screws are placed adjacent to each other without a partition wall, and the shafts of the screws are horizontal and in parallel, and are located in the same horizontal plane.

The central line of the shaft of each screw is preferably placed at the same level as the upper edge of the space, or the shafts are placed so that at least the upper edge of the thread flanks of the screws is located above the upper edge of the space. The bottom of the space is preferably adapted to the diameter of the screw threads so that a longitudinal edge is formed between the screws. A narrow down pipe is connected to the bottom of the space for receiving the material discharged from the container. The down pipe preferably has a diameter corresponding to the width of the space.

According to a preferred embodiment of the present invention, the down pipe is placed centrally beneath the container, and the screws are arranged to feed the material from two directions inwardly towards the down pipe. Alternatively, the down pipe can be placed at one end of the oblong space, and the screws are formed for feeding only in that direction.

It is suitable according to the present invention to form the screws with a space between the threads increasing in the direction towards the down pipe. This can be achieved by the thread pitch increasing in the direction towards the down pipe or by the diameter of the shafts of the screws decreasing in the direction towards the down pipe, or by a combination of these alternatives. In this manner, more uniform feeding of the material can be maintained across the cross-section of the container.

According to another preferred embodiment of the present invention with a centrally located down pipe, each screw is formed with a distributor in the form of a radial disc located centrally above the down pipe. The disc should have a diameter corresponding to the diameter of the screw threads, and it should have a thickness decreasing towards the circumference thereof. By this design the feed down through the down pipe is improved to an even greater extent.

According to another embodiment of the present invention, the down pipe is located directly above a pump, by which the material fed down through the down pipe is pumped to a subsequent treatment step. As the discharge screws bring about a uniform discharge from the container, the flow through the pump also becomes uniform and stable, which results in high operation safety and uniform treatment of the material.

According to another embodiment of the present invention, supply means for the addition of a treatment medium is connected to the discharger. This supply means is preferably formed with a plurality of nozzles for supply of the medium along the length of each screw, preferably through the walls of the space beneath the container at the same level as the shafts of the screws. This position is especially favorable for supply of the medium, because the material is in motion and, thus, the admixing will be good.

BRIEF DESCRIPTION OF THE DRAWINGS

The present invention is described in greater detail in the following detailed description, which, in turn, refers to the accompanying Figures illustrating an embodiment of the present invention, in which:

FIG. 1 is a side, elevational view of a container in accordance with the present invention;

FIG. 2 is a front, elevational view of the container shown in FIG. 1; and

FIG. 3 is a top, elevational view of the container shown in FIGS. 1 and 2.

DETAILED DESCRIPTION

The embodiment of the present invention shown in the drawings comprises a container 10, which has a cylindrical upper portion 11 and a lower portion 12, which converges from opposed sides to a space 13 at the bottom of the container. This space 13 has a substantially rectangular cross-section and is adapted to two feed screws, 14 and 15, which have horizontal and parallel shafts located in a common horizontal plane. The screws are provided with threads for feeding the material and are arranged so that the outer circumferences of the screw threads are located at a small distance from each other without a partition wall between the screws.

The thread flanks of the screws, 14 and 15, extend upwards above the upper edge of the space 13. The bottom of the space 13 follows the diameter of the screw threads whereby a longitudinal edge 22 is formed between the screws, 14 and 15. The edge 22 is located highest at the same level as the center line of the screws.

Centrally, beneath the space 13, a down pipe 16 is connected for receiving material from the container. The down pipe 16 has a diameter corresponding to the width of the space 13. The screws, 14 and 15, are formed with threads for feeding the material inwardly toward the down pipe 16. The rotational direction of the screws is opposed, so that the upwardly turned portion of the screws moves from the outer wall of the space 13 inwardly toward the center of the space. This requires that the thread pitch at the end of a screw, 14 and 15, is opposed. Centrally on each screw, 14 and 15, a distributor 17 is located. This distributor 17 is formed with a radial disc, the thickness of which decreases successively from the center outwardly to its circumference. The distributor 17 has the same diameter as the screw thread, and its object is to interrupt the axial feed of the screws and direct the material down into the down pipe 13.

The screws, 14 and 15, are driven each by its motor, 18 and 19, at uniform speed, and the two screws suitably have the same speed. In order to additionally ensure that the material is fed from the entire cross-section of the container, the screws can be formed with a space between the threads increasing inwardly to the down pipe, for example increasing thread pitch or decreasing screw shaft diameter.

Beneath the down pipe 13 a pump 20 is located. The pump inlet is thus directly connected to the down pipe, which implies that the pump 20 can deliver a uniform outgoing material flow to a subsequent treatment step.

According to the embodiment shown in the drawings, a plurality of nozzles 21 are connected to the space 13 for the supply of treatment medium in the form of a gas or liquid, such as steam and chemicals. These nozzles 21 are located at both long sides of the space 13 at the same height as the shafts of the screws so that optimum admixing to the material is obtained.

By forming the container with a discharger with two feed screws according to the present invention it has proved possible to improve the discharge and effectively to prevent the material from adhering or being fed non-uniformly in the container. It is, at the same time, possible to obtain an even and operationally safe pumping of the material directly from the discharge out of the container to subsequent treatment steps.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A container for collecting and discharging particulate lignocellulosic material comprising a substantially cylindrical upper portion having a first cross-section, a lower portion tapering from said substantially cylindrical upper portion to a bottom defining an elongated space, an exit pipe disposed below said bottom of said container, said exit pipe having a second cross-section and disposed substantially centrally below said elongated space, said second cross-section being less than said first cross-section, a pair of parallel screws mounted on a pair of parallel shafts disposed in said elongated space in a common horizontal plane, said pair of parallel screws being adapted to feed said particulate lignocellulosic material towards said exit pipe, a pair of distributors for said particulate lignocellulosic material disposed on said respective pair of parallel screws at a location above said exit pipe, said pair of distributors comprising a pair of substantially radial discs, and a pump disposed below said exit pipe for transporting said particulate lignocellulosic material to a subsequent step.

2. The container of claim 1 wherein said screws comprise threads including flanks having an upper portion adapted for conveying said particulate lignocellulosic material, said bottom defining said elongated space having a configuration including a raised portion defining an upper edge, said upper portion of said thread flanks being disposed above said upper edge of said elongated space.

3. The container of claim 2 wherein said pair of parallel shafts includes a central axis disposed substantially at said upper edge of said elongated space.

4. The container of claim 2 wherein said threads include intermediate spaces between said threads which increase in the direction towards said exit pipe.

5. The container of claim 4 wherein said threads have an increasing pitch in said direction towards said exit pipe.

6. The container of claim 4 wherein said pair of parallel shafts includes a diameter which decreases in said direction towards said exit pipe.

7. The container of claim 2 wherein said substantially radial discs have a disc diameter and said screw threads have a thread diameter, said disc diameter being substantially the same as said thread diameter.

8. The container of claim 7 wherein said substantially radial discs have a center and a thickness which decreases outwardly from said center.

9. The container of claim 1 including entry means for addition of a treatment medium into said elongated space.

* * * * *